United States Patent

[11] 3,599,697

[72] Inventor Gerhart L. Gerbeth
        Akron, Ohio
[21] Appl. No. 851,942
[22] Filed Aug. 21, 1969
[45] Patented Aug. 17, 1971
[73] Assignee The Goodyear Tire & Rubber Company
        Akron, Ohio

[54] WHEEL RIM AND DRIVER LUG ASSEMBLY THEREFOR
    12 Claims, 8 Drawing Figs.
[52] U.S. Cl. ................................................. 152/410
[51] Int. Cl. ................................................. B60c 5/16
[50] Field of Search .......................................... 152/410

[56]         References Cited
        UNITED STATES PATENTS
3,106,237  10/1963  Holmes, Jr. ................... 152/410
3,224,484  12/1965  Smith ........................... 152/410
3,529,869  9/1970   Casey ........................... 152/410

Primary Examiner—Arthur L. La Point
Assistant Examiner—Robert Saifer
Attorneys—F. W. Brunner and Paul E. Milliken ABSTRACT: A multipiece wheel rim having a special driver lug assembly, having a pair of circumferentially spaced-apart lugs mounted on a bead seat ring to engage a member attached to the rim base of a wheel rim and prevent circumferential movement of the bead seat band on the rim base when the rim is used on a vehicle. The driver lugs are so designed and positioned that they permit substantially uniform radial flexing of the bead seat band thereby preventing undesirable stresses at any given location on the bead seat band.

3,599,697
PATENTED AUG 17 1971
SHEET 1 OF 2
FIG. 1
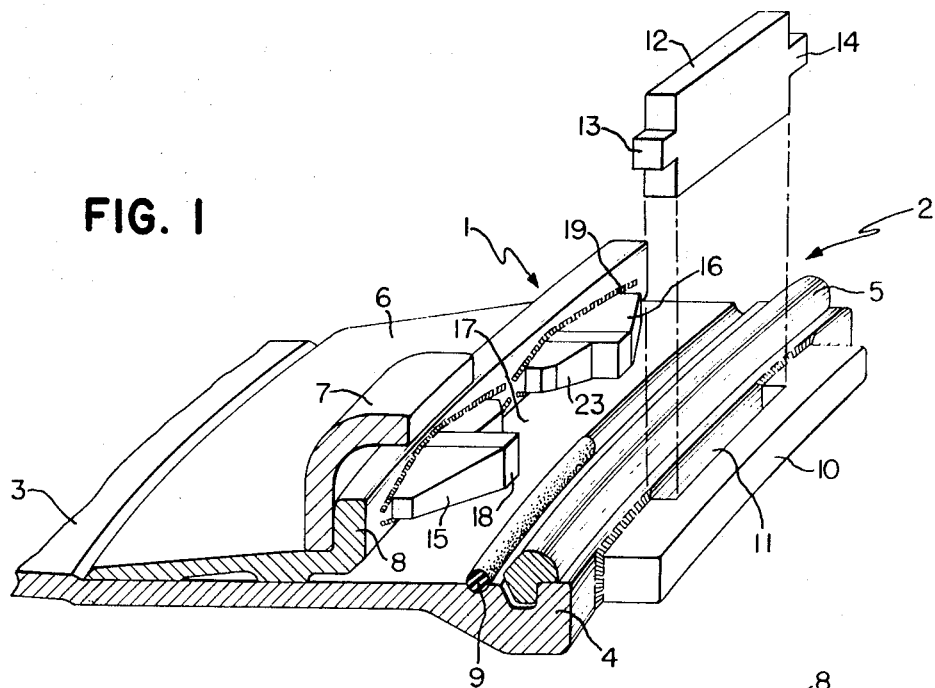
FIG. 2
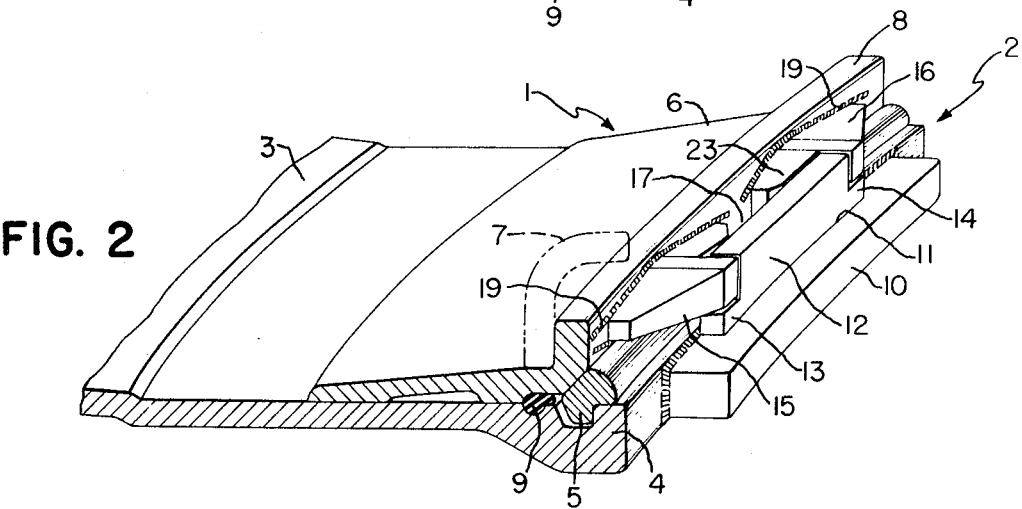
FIG. 3
INVENTOR.
GERHART L. GERBETH
BY
*A. Milliken*
ATTORNEY

PATENTED AUG 17 1971   3,599,697

INVENTOR.
GERHART L. GERBETH

BY

ATTORNEY

WHEEL RIM AND DRIVER LUG ASSEMBLY THEREFOR

This invention relates to a multipiece wheel rim and more particularly to a rim driver assembly having a particular lug configuration which eliminates undesirable stresses in the bead seat band of the wheel rim.

BACKGROUND OF THE INVENTION

This invention is an improvement on previously issued U.S. Pat. No. 3,003,538 issued to G. L. Gerbeth who is also the inventor of this invention. This invention is designed for use on multipiece wheel rims of the type shown in the previous Gerbeth patent and is designed to relieve certain stress conditions which were encountered in the bead seat band when using the driver assembly shown in the above-mentioned patent. In the prior patent, an elongated member 11 having a slot 13 therein was welded to the bead seat band for the purpose of engaging other members extending from the rim base to prevent circumferential movement of the bead seat band on the rim base. The member 11, however, in the prior Gerbeth patent, stiffened the portion of the bead seat band to which it was attached so that the band could not flex radially in that area. This resulted in increased flexing along a transverse line at each end of the member 11. This concentrated flexing in these particular areas ultimately resulted in weakening and failure of the bead seat band in these areas. To overcome this difficulty, it was found that if the member which was attached to the bead seat band was divided into two individual parts and the parts were properly tapered, such configuration would permit greater freedom for radial flexing around the entire circumference of the bead seat band and, thereby, substantially reduce the concentrated stresses which precipitate failures of the bead seat band.

OBJECTS OF THE INVENTION

It is a primary object of this invention to provide a driver lug assembly on the bead seat band of a vehicle wheel rim which will not create areas of undue stress concentration due to flexing of the bead seat band in a certain area. Another object of the invention is to provide a driver lug assembly on the bead seat band which may be used with existing driver assembly components that are mounted on the rim base. These and other objects of the invention will become more fully apparent as the description proceeds in the following specification and the accompanying drawings.

BRIEF DESCRIPTION OF THE DRAWINGS

FIG. 1 is a perspective view showing the wheel rim assembly with the rim driver in a disassembled position;

FIG. 2 shows a fragmentary perspective view of the wheel rim assembly with the rim driver in the assembled position;

FIG. 3 is an enlarged fragmentary perspective view of a portion of the bead seat band with the driver lug assembly of the invention mounted thereon;

BRIEF DESCRIPTION OF THE INVENTION

Figure 4:
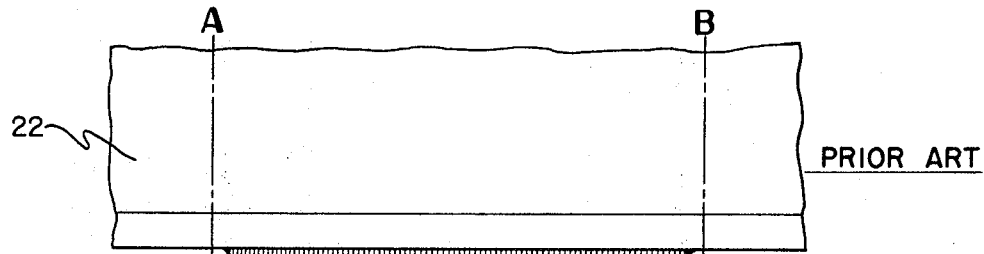
FIG. 4 is a fragmentary plan view showing the prior art structure of a driver member attached to a bead seat band of a wheel rim.
Figure 5:
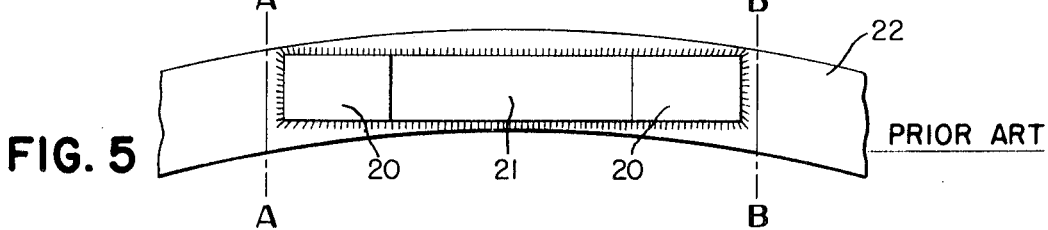
FIG. 5 is a side elevation of the prior art structure shown in FIG. 4.
Figure 6:
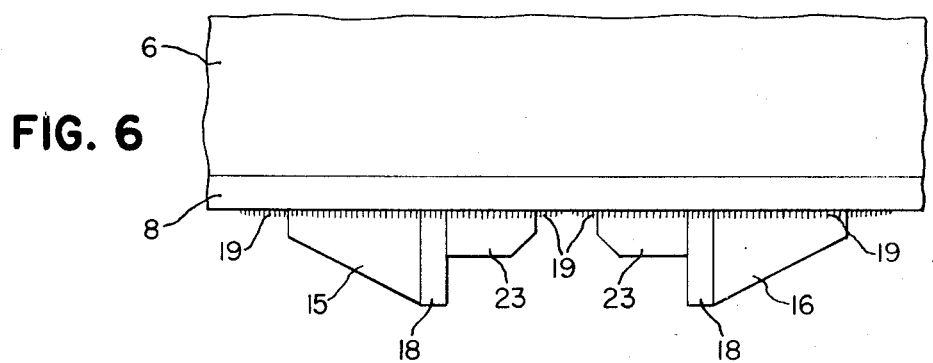
FIG. 6 is a fragmentary plan view of the driver lug assembly of the invention shown in FIG. 3.
Figure 7:
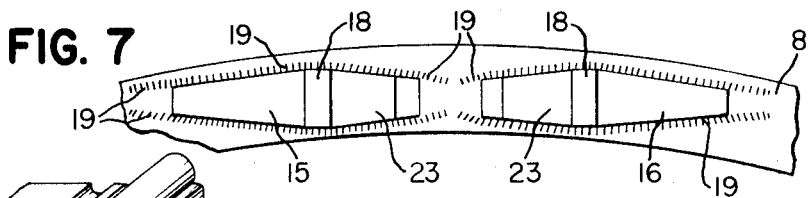
FIG. 7 is a fragmentary side elevation of the driver lug assembly shown in FIG. 6.

Since the present rim structure is substantially identical to that shown in the previously mentioned Gerbeth U.S. Pat. No. 3,003,538, the overall rim structure will not be described in great detail. Referring now to FIG. 1 of the present invention, the wheel rim assembly is indicated as a whole by the numeral 1. The entire driver assembly is indicated by the numeral 2. The wheel rim assembly 1 has an endless cylindrical rim base 3. Along one axial edge of the rim base 3, a gutter edge portion 4 carries a split lockring 5 which is mounted to engage an endless bead seat band 6 which telescopes over the rim base 3. A rim flange 7 engages the outwardly flanged portion 8 of the bead seat band 6. Between the bead seat band 6 and the rim base 3, an O-ring 9 is located which, when the rim is in the assembled position, is distorted and compressed under axial and radial stresses to seal the passageways between the rim parts through which the air would escape from the tire. The particular rim construction illustrated is commercially available and the description hereof is only general in nature to illustrate the invention. It will be apparent that the invention would also be applicable to other types of rims for preventing relative circumferential movement of various rim parts. In order to prevent slipping between the bead seat band 6 and the rim base 3 when the tire and rim are subjected to a torque, the driver assembly 2 is used to securely connect the rim base 3 and the bead seat band 6 so that no relative circumferential movement will occur. As part of the driver assembly 2, an elongated slotted member 10 is attached to the gutter edge 4 of the rim base 3, preferably by welding. The slotted member 10 has an axially inward facing slot 11 for receiving a driver 12 having two projecting ears 13 and 14 on each end thereof. When the driver 12 is positioned in the slot 11, as shown in FIG. 2, the ears 13 and 14 contact the slotted member 10 at the ends of slot 11 and prevent the driver 12 from dropping through the slot 11. A pair of driver lugs 15 and 16 are attached to the outward-flanged portion 8 of the bead seat band 6 in spaced circumferential relationship to each other. The driver lugs 15 and 16 are substantially identical and are positioned upon the flanged portion 8 in opposed relationship to each other to define a pocket 17 therebetween for receiving the upper portion of the driver 12. It may be seen that when the driver assembly is in the assembled position, as shown in FIG. 2, the driver lugs 15 and 16, in addition to contacting the ends of the driver 12, contact the top of the ears 13 and 14 to hold the driver 12 in position in the slot 11. This means that when the wheel rotates and the driver 12 is below the slotted member 10, it will not drop out because it is retained by the driver lugs 15 and 16. Referring now to FIG. 3, the driver lug assembly made up of driver lugs 15 and 16 is shown welded to the flange portion 8 of the bead seat band 6. Each of the driver lugs 15 and 16 has an enlarged portion 18 from which the sides of the lug taper in both directions toward the end thereof so that each end is of smaller cross section than the enlarged portion 18. Each of the lugs 15 and 16 is welded along each side thereof by a weld seam 19 which extends beyond each end of each of the lugs. The purpose of the tapered contour of the lugs and of extending the weld seams beyond the ends of the lugs is to provide a gradual transition in stiffness in the bead seat band between the thickest portion of each lug and the portion of the bead seat band extending beyond the end of each lug. This gradual transition of stiffness is desirable since it eliminates the problem encountered in the prior art device shown in FIGS. 4 and 5 in which a continuous slotted driver member 20 having a pocket 21 therein is welded to a bead seat band 22. When the continuous member 20 is used, the bead seat band 22 is stiffened throughout the entire length of the member 20 and therefore, the radial flexing of the bead seat band 22 in that area is eliminated or at least substantially reduced to the point that concentrated flexing occurs in the transverse areas indicated by the lines A—A and B—B in FIGS. 4 and 5. Such concentrated flexing eventually weakens the bead seat band to the point that it will crack under continued use. The present invention solves this problem by eliminating the long, stiff area along the circumference of the bead seat band as is produced by use of the continuous member 20. As shown in FIGS. 6 and 7, the present invention interrupts the long continuous stiffened area by the use of separate individual driver lugs 15 and 16. The stiffness is further reduced by tapering the lugs 15 and 16, as previously described in the description in FIG. 3. In addition, the continuation of the weld seams 19 beyond the ends of each lug provides a more gradual transition between the very thick portions 18 of the lugs and the area on the bead seat band near the ends of the lugs. This reduces the possibility of a concentrated stress area in the bead seat band such as that illustrated in FIGS. 4 and 5 at lines A-A and B-B. The lugs 15 and 16 each have a stepped portion 23 which, taken together with the portion 23 of the opposite lug, form the pocket 17 which receives the driver 12. It will be obvious that various tapers may be used on the lugs, depending upon the particular stress requirements of each bead seat band on which the lugs are used. It should also be understood that the driver lugs shown in the present invention may be used with other configurations of drivers which may be mounted on the rim base in a different manner from that illustrated in the present invention.

Figure 8:
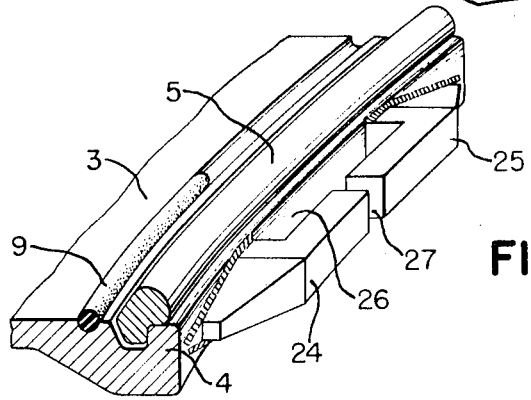
FIG. 8 is a fragmentary view showing another embodiment of the invention.

FIG. 8 shows a fragmentary portion of the rim base 3 similar to that shown in FIGS. 1 and 2, but having, instead of the slotted member 10, a pair of bracket members 24 and 26 each having one end portion welded to the axially outer edge of the gutter edge portion 4 and the opposite end spaced from the edge portion 4 so that both spaced ends form a slot 26 between them and the edge portion 4 similar to the slot 11 in FIGS. 1 and 2. The welded end portions of the members 24 and 25 are tapered in a manner similar to the driver lugs 15 and 16. The adjacent ends of the members 24 and 25 have a space 27 therebetween to permit flexing of the rim base 3. This embodiment may be used when it is desired to give more flexibility to the rim base in the area of the member 10 to relieve undesirable flexing stress concentrations. The member 10 shown in FIGS. 1 and 2 may also be tapered at each end in the same manner as the members 24 and 25 for better stress distribution throughout the rim base 3.

Various modifications may be made in the overall rim assembly structure without departing from the scope of the invention so long as the basic idea is used of relieving the stresses in the band to which the lugs are attached by dividing the single member into two shorter members to break up the long stiffened area and provide more uniform flexing throughout the entire circumference of the band.

What I claim is:

1. A multipiece wheel rim comprising:
   A. an endless cylindrical rim base;
   B. a removable endless bead seat band encircling said rim base;
   C. locking means engaging the rim base and the bead seat band to maintain the base and the bead seat band in the assembled position when a tire is mounted on said rim; and
   D. driver means to prevent relative circumferential movement between said rim base and said bead seat band when said tire and rim are in use on a vehicle, said means comprising:
      1. a first means attached to and extending from the axial outer edge of the rim base across at least a portion of the axial outer edge of the bead seat band,
      2. a second means comprising a pair of circumferentially spaced-apart driver lugs individually attached to the bead seat band,
      3. said lugs extending from the bead seat band and defining a pocket therebetween for receiving a portion of the first means,
      4. each driver lug having a portion of enlarged cross section extending transversely thereof and tapering to a smaller cross section at each end.

2. A multipiece wheel rim as claimed in claim 1 wherein each driver lug is welded to the bead seat band and the welds are extended beyond each end of the lug.

3. A multipiece wheel rim as claimed in claim 1 wherein each lug has a stepped portion on the end facing the opposed lug, said stepped portion forming the pocket for receiving the first means.

4. A multipiece wheel rim as claimed in claim 1 wherein the first means comprises a fixed member attached to the rim base and a removable member carried by the fixed member.

5. A multipiece wheel rim as claimed in claim 4 wherein the removable member extends into the pocket formed by the two driver lugs and is held in position by the driver lugs when the wheel rim is in the assembled position with a tire thereon.

6. A multipiece wheel rim as claimed in claim 1 wherein the first means comprises a pair of fixed members attached to the rim base and a removable member carried by said fixed members.

7. A driver lug assembly for use on a multipiece wheel rim to prevent circumferential movement between a rim base and a bead seat band by engaging a driver means extending from the rim base across an axial outer edge of the bead seat band, the lug assembly comprising:
   A. a pair of circumferentially spaced-apart driver lugs attached to the bead seat band;
   B. said lugs defining a pocket therebetween for engaging the driver means attached to the rim base;
   C. the portion of the bead seat band between the driver lugs being sufficiently flexible to permit radial flexing of the bead seat band in that area to relieve undesirable stress concentrations in other parts of the bead seat band;
   D. each driver lug having an intermediate portion of enlarged cross section and tapering to a smaller cross section at each end.

8. A multipiece wheel rim as claimed in claim 7 wherein each driver lug is welded to the bead seat band and the welds are extended beyond each end of the lug.

9. A multipiece wheel rim as claimed in claim 7 wherein each lug has a stepped portion on the end facing the opposed lug, said stepped portion forming the pocket for receiving the driver means.

10. A multipiece wheel rim comprising:
    A. an endless cylindrical rim base;
    B. a removable endless bead seat band encircling said rim base;
    C. locking means engaging the rim base and the bead seat band to maintain the base and the bead seat band in the assembled position when a tire is mounted on said rim; and
    D. driver means to prevent relative circumferential movement between said rim base and said bead seat band when said tire and rim are in use on a vehicle, said means comprising:
       1. a first means attached to and extending from the axial outer edge of the rim base across at least a portion of the axial outer edge of the bead seat band, and
       2. a second means comprising a pair of circumferentially spaced-apart driver lugs individually attached to the bead seat band,
       3. said lugs extending from the bead seat band and defining a pocket therebetween for receiving a portion of the first means,
       4. each driver lug having a portion of enlarged cross section extending transversely thereof and tapering to a smaller cross section at each end.

11. A driver lug assembly for use on a multipiece wheel rim to prevent circumferential movement between a rim base and a bead seat band by engaging a driver means extending from the rim base across an axial outer edge of the bead seat band, the lug assembly comprising:
    A. a pair of circumferentially spaced-apart driver lugs attached to the bead seat band;
    B. said lugs defining a pocket therebetween for engaging the driver means attached to the rim base;
    C. the portion of the bead seat band between the driver lugs being sufficiently flexible to permit radial flexing of the bead seat band in that area to relieve undesirable stress concentrations in other parts of the bead seat band;
    D. each lug having a stepped portion on the end facing the opposed lug, said stepped portion forming the pocket for receiving the driver means.

12. A multipiece wheel rim comprising:
A. an endless cylindrical rim base;
B. a removable endless bead seat band encircling said rim base;
C. a split lockring engaging the rim base and the bead seat band to maintain the base and the bead seat band in the assembled position when a tire is mounted on said rim; and
D. driver means to prevent relative circumferential movement between said rim base and said bead seat band when said tire and rim are in use on a vehicle, said means comprising:
 1. a first means attached to the axial outer edge of the rim base and defining therebetween a radially extending slot,
 2. a second means comprising a pair of circumferentially spaced-apart driver lugs individually attached to the bead seat band,
 3. said lugs extending from the bead seat band and defining a pocket therebetween, and
 4. a removable driver lug extending radially through both the slot in the first means and the pocket in the second means and lying axially outwardly of the split lockring,
 5. said driver having a pair of ears on each end which lie between the first and second means when the wheel rim is assembled to prevent the driver lug from moving radially in either direction.